(12) United States Patent
Hjelt

(10) Patent No.: US 9,482,381 B1
(45) Date of Patent: Nov. 1, 2016

(54) MINERAL WOOL PIPE INSULATION

(71) Applicant: Paroc Group Oy, Helsinki (FI)

(72) Inventor: Tuomo Hjelt, Lappeenranta (FI)

(73) Assignee: PAROC GROUP OY, Helsinki (FI)

( * ) Notice: Subject to any disclaimer, the term of this patent is extended or adjusted under 35 U.S.C. 154(b) by 0 days.

(21) Appl. No.: 14/973,929

(22) Filed: Dec. 18, 2015

(51) Int. Cl.
| | |
|---|---|
| F16L 9/14 | (2006.01) |
| F16L 59/14 | (2006.01) |
| B65D 81/38 | (2006.01) |
| B29C 41/00 | (2006.01) |
| B29K 511/10 | (2006.01) |
| B29L 23/00 | (2006.01) |

(52) U.S. Cl.
CPC .............. *F16L 59/14* (2013.01); *B29C 41/003* (2013.01); *B65D 81/38* (2013.01); *B29K 2511/10* (2013.01); *B29K 2995/0015* (2013.01); *B29L 2023/225* (2013.01)

(58) Field of Classification Search
CPC ...................................................... F16L 59/14
USPC .................................. 138/162, 157, 166, 149
See application file for complete search history.

(56) References Cited

U.S. PATENT DOCUMENTS

| | | | | | |
|---|---|---|---|---|---|
| 2,788,304 | A | * | 4/1957 | Scovronek | F16L 59/024 138/151 |
| 3,095,014 | A | * | 6/1963 | Dosker | F16L 9/01 138/149 |
| 3,095,337 | A | * | 6/1963 | Chase | F16L 59/024 138/155 |
| 3,126,035 | A | * | 3/1964 | Espetvedt | F16L 59/024 138/162 |
| 3,489,183 | A | * | 1/1970 | Eberle | B29C 67/2245 138/128 |
| 3,598,157 | A | * | 8/1971 | Farr | F16L 59/22 138/109 |
| 3,628,572 | A | * | 12/1971 | Shannon | F16L 59/024 138/149 |
| 4,287,245 | A | * | 9/1981 | Kikuchi | F16L 59/024 138/141 |
| 4,298,554 | A | * | 11/1981 | Vogel | C04B 28/26 106/38.3 |
| 4,304,267 | A | * | 12/1981 | Campbell, Jr. | C04B 30/02 138/149 |
| 4,576,846 | A | * | 3/1986 | Noel | B29C 65/58 138/128 |
| 5,851,330 | A | | 12/1998 | Cridland et al. | |
| 6,403,180 | B1 | * | 6/2002 | Barrall | B32B 1/08 138/141 |
| 8,459,159 | B2 | | 6/2013 | Jessen et al. | |
| 2005/0022892 | A1 | * | 2/2005 | Babineau, Jr. | F16L 59/023 138/149 |
| 2008/0006339 | A1 | * | 1/2008 | Albrecht | F16L 59/021 138/149 |

FOREIGN PATENT DOCUMENTS

| | | |
|---|---|---|
| EP | 2397742 A1 | 12/2011 |
| EP | 1891258 B1 | 11/2012 |

* cited by examiner

*Primary Examiner* — Patrick F Brinson
(74) *Attorney, Agent, or Firm* — Robert P. Michal, Esq.; Carter, DeLuca, Farrell & Schmidt, LLP

(57) ABSTRACT

Mineral wool pipe insulation, the mineral wool thereof includes a mix of mineral wool fibers and at least a curable binder being cured. The pipe insulation includes at least two separate elongated partial sections of mineral wool that are inter-connectable to each other around a pipe or container to form an insulation layer encompassing the pipe or container. Each separate partial section being inter-connectable by being provided with interconnecting means along at least two thickness-wise edges thereof. A method of manufacturing mineral wool pipe insulation includes forming each separate partial section of mineral wool by sawing or cutting from a cured block of mineral wool, or by curing a mixture of loose mineral wool fibers and a curable binder in a mold.

10 Claims, 3 Drawing Sheets

MINERAL WOOL PIPE INSULATION

FIELD OF THE INVENTION

The invention relates to the field of insulation, especially of pipes, containers, ventilation ducts and similar tubular installations.

BACKGROUND INFORMATION

In building and process technology, it is quite common to insulate, for instance, pipes and containers. The insulation can take place by means of, e.g. pipe sections, sheets or mats of mineral wool, which on its side facing the ambient air has a protective surface layer of plastic, paper or metal.

Previously known prior art mineral wool pipe insulations are manufactured in many different ways, e.g. by winding a mineral wool mat around the object to be insulated.

EP2397742A1 teaches a method for manufacturing a mineral wool pipe section for insulating purposes, wherein uncured mineral wool mat is cut to a length matching the desired wall thickness of a section to be manufactured. The cut length is wound around a core, and next the core, and the cylinder of mineral wool around it, are placed in a mold and cured, e.g. with hot air and/or microwaves. This is followed by drawing the cured section off of the top of the core, by sawing off the core ends, and, in a typical case, by finally coating the sections, e.g. with a fiber mesh reinforced aluminum foil. The coated section is slit open longitudinally by at least one line along its entire length.

EP1891258B1 teaches a method for manufacturing a mineral wool pipe section for insulating purposes, wherein mineral wool in the form of loose material is fed into a space between a core and a substantially tubular external mould surrounding it. The result being a substantially tubular insulation preform which is cured by microwave irradiation.

Also known is, e.g. from U.S. Pat. No. 8,459,159, a method of producing tubular elements by way of stamping from a nonwoven web of mineral wool.

Also known is, e.g. from U.S. Pat. No. 5,851,330, a tubular insulation member of mineral wool composed of a coaxial assembly of slitted insulation discs having a central hole. The assembly of discs is provided by sawing out from a stack of bonded mineral fiber sheets. Thereafter, the assembly thus obtained is enveloped in a sheet material, e.g. of a corrugated metal foil.

OBJECTS OF THE PRESENT INVENTION

One object of the present invention is to provide a mineral wool pipe insulation system which is easy to manufacture and easy to mount.

SUMMARY

The present invention concerns a mineral wool pipe insulation. The mineral wool includes a mix of mineral wool fibers and at least a curable binder being cured. The mineral wool pipe insulation includes at least two separate partial sections of mineral wool that are inter-connectable to each other around a pipe or container to form an insulation layer encompassing the pipe or container. Each separate partial section is inter-connectable by being provided with inter-connecting means along at least two thickness-wise edges thereof. The present invention also concerns a method of manufacturing mineral wool pipe insulation, wherein each separate partial section of mineral wool is made by sawing or cutting from a cured block of mineral wool.

A preferable method of manufacturing mineral wool pipe insulation involves sawing or cutting, e.g. by waterjet cutting, the separate partial sections, which are to be interconnected around a pipe or container to form a pipe insulation section. The separate partial sections are cut from a block of cured mineral wool having a density in the range of 40-150 kg/m$^3$. A cured block of mineral wool is produced by applying a binding agent to newly formed mineral wool fibers and forming the fibers into a mineral wool block which is then cured, e.g. in a curing oven or by microwave curing. The block can also include further additives such as fire retardants.

DETAILED DESCRIPTION

First Embodiment

Figure 1:
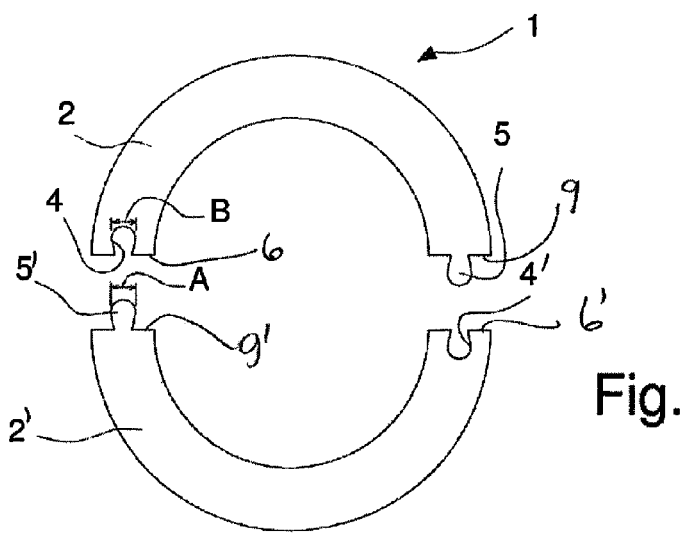
FIG. 1 shows schematically in a cross-sectional view an embodiment of mineral wool pipe insulation according to the present invention.

With reference now to FIG. 1, the following is a description of a preferred embodiment for manufacturing mineral wool pipe insulation for pipes having a diameter in the range of 15-1016 mm. In this diameter range, the pipe insulation of the invention to be installed around a pipe, includes two separate, identically (or at least substantially similarly) shaped half sections 2, 2' of mineral wool that by their interconnecting means 4, 4', 5, 5' can be interconnected around a pipe.

As shown in FIG. 1, being a sectional view of the two half sections 2, 2' in the plane of their widths, the two half sections 2, 2' of cured mineral wool are each provided with a groove 4, 4', extending along a first longitudinal edge 6, 6' of the two thickness-wise edges of the half section 2, 2' that run in the longitudinal direction of the half section, and a tongue 5, 5', extending along a second longitudinal edge 9, 9' of the two thickness-wise edges of the half sections 2, 2' that run in the longitudinal direction of the half section.

In order to make the interconnection of the two half sections 2, 2' around a pipe secure, the width A of the tongue 5, 5' is slightly larger than the width B of the groove 4, 4' to such an extent that the tongue 5, 5' by hand is possible to be pressed into the groove 4, 4', and consequently locked therein upon release of the pressure.

A preferable way of manufacturing mineral wool half sections 2, 2' is by sawing or cutting, e.g. by water jet cutting, each of these either separately as one half section at a time from a block of cured mineral wool, directly also forming the groove and tongue, in the one and the same sawing or cutting step. By sawing or cutting the half sections separately it is possible to made the width A of the tongue 5, 5' slightly larger than the width B of the groove 4, 4'. It is also possible to manufacture the half sections by first cutting a full section from a block of cured mineral wool and then cutting in one and the same step the full section into two identical half sections having a groove and a tongue. In this case the dimensions of the tongue and groove are essentially the same but due to their form the tongue is locked securely in the groove.

When the two identical half sections 2, 2', a first half section 2 and a second half section 2', of this embodiment are interconnected with each other around a pipe, the tongue 5' of the second section 2' is pressed into the groove 4 of the first half section 2, and the tongue 5 of the first half section 2 is pressed into the groove 4' of the second half section 2'.

Figure 2:
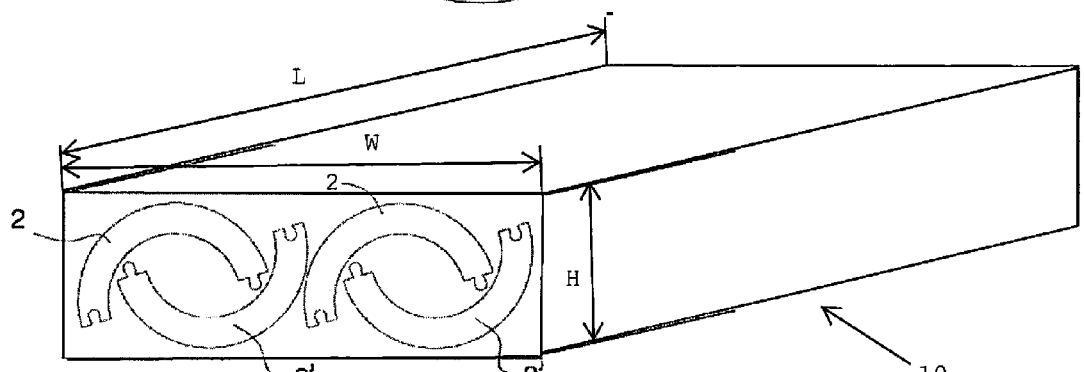
FIG. 2 shows schematically in an isometric view an example of a mineral wool block from which half sections for the mineral wool pipe insulation of FIG. 1 are cut.

FIG. 2 is an isometric view of a cured mineral wool block showing a preferable way of cutting two pairs of the identical elongated half sections 2, 2' to minimize cutting waste. The block may have, e.g. the following dimensions: length L=1200 mm, width W=1000 mm and height H=350 mm.

Figure 3:
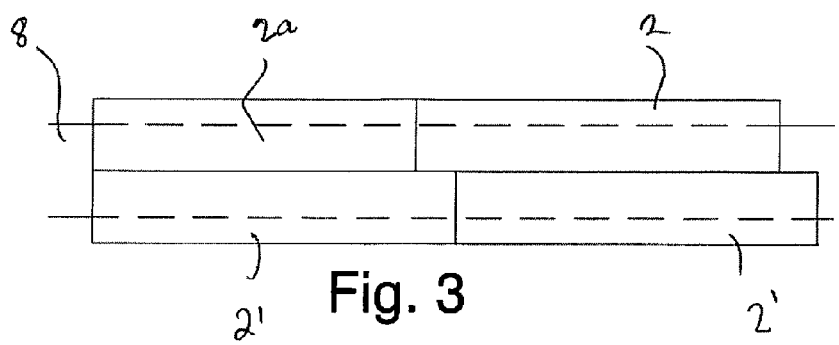
FIG. 3 shows schematically an example of installing half sections of the mineral wool insulation around a pipe as seen from a side of the pipe.

A preferred method of installing the half sections 2, 2' around a pipe 8 is schematically depicted in FIG. 3. In this method the first half section to be installed is cut shorter at the installation site, e.g. if the half sections 2, 2' have a length of 1200 mm the first half section to be installed is cut shorter e.g., by 200 mm into the length of 1000 mm. This cut half section is referred to as half section 2a in FIG. 3 and is placed on top of the pipe to be insulated. Thereafter one continues by alternately connecting full-length (e.g. 1200 mm) half sections 2, 2' on top and below of the pipe line. In this way, each top half section 2 is attached to the previous half section 2' below and no further fixing means are required. The installation is finished with metal sheeting. No further mechanical fixing is necessary.

Figure 4:
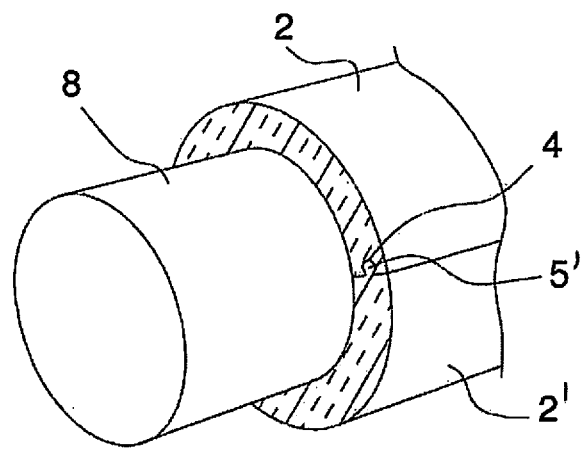
FIG. 4 shows schematically in a perspective view of half sections of the mineral wool insulation installed around a pipe.

A sectional perspective drawing of these half sections 2, 2' installed around a pipe 8 is shown in FIG. 4.

Second Embodiment

Figure 5:
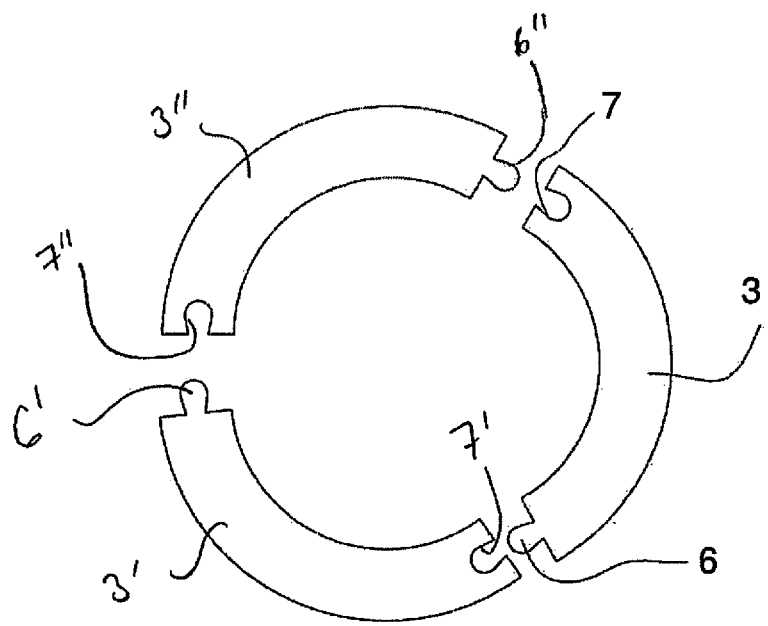
FIG. 5 shows schematically in a cross-sectional view a second embodiment of mineral wool pipe insulation according to the present invention.

A second embodiment of the present invention is shown in FIG. 5. In this embodiment, the mineral wool pipe insulation is achieved by interconnecting three identically shaped partial mineral wool sections 3, 3', 3" around a pipe to form a full pipe insulation section. Each partial section 3, 3', 3" is provided with a groove 7, 7', 7" and a tongue 6, 6', 6", respectively, in the two thickness-wise edges thereof in a similar manner as in the first embodiment.

In order to make the interconnection of the three identical mineral wool partial sections 3, 3', 3" around a pipe secure, correspondingly as in the first embodiment, the width of the tongue 6, 6', 6" is made slightly larger than the width of the groove 7, 7', 7" to such an extent that each tongue 6, 6', 6" by hand is possible to be pressed into the corresponding groove 7, 7', 7" and consequently locked therein upon release of the pressure.

The three identical partial section 3, 3', 3" may be manufactured in a similar way as in the first embodiment; i.e. by sawing or cutting each of partial sections 3, 3', 3" either separately as a third of a section at a time from a block of cured mineral wool, directly also forming the groove and tongue, in the one and the same sawing or cutting step. It is also possible to manufacture the three thirds of a section by first cutting a full section from a block of cured mineral wool and then cutting in one and the same step the full section into three identical thirds of a section having a groove and a tongue.

When three identical partial sections 3, 3', 3" of this embodiment are interconnected with each other around a pipe, the tongue 6 of the first partial section 3 is pressed into the groove 7' of the second partial section 3', and the tongue 6' of the second partial section 3' is pressed into the groove 7" of the third partial section 3", and the tongue 6" of the third partial section 3" is pressed into the groove 7 of the first partial section 3.

The thirds 3, 3', 3" of a section in this embodiment may be installed in a similar alternating way as was done in connection with the first embodiment.

Figure 6:
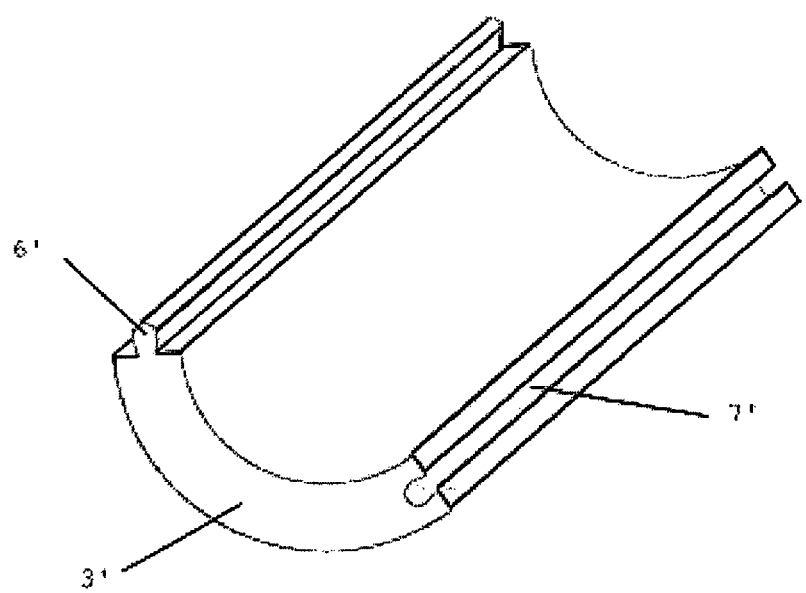
FIG. 6 shows schematically in an isometric view a section of the pipe insulation of FIG. 5.

FIG. 6 shows a partial section 3' in an isometric view.

Third Embodiment

As an alternative to the first embodiment wherein two identical half sections are interconnected around a pipe line, a third embodiment is presented herein. In this third embodiment the half sections are otherwise identical (or at least substantially identical) with the exception that one of the half sections has a groove in each of the two thickness-wise edges of the half section, whereas the other half section has a tongue in each of the two thickness-wise edges thereof that run in the longitudinal direction of the half section in question.

The two half sections of this embodiment may be manufactured in a similar way as in the first embodiment; i.e. by sawing or cutting each of two half sections either separately as one half section, with either two tongues or two grooves, at a time from a block of cured mineral wool, directly also forming the two grooves or the two tongues, in the one and the same sawing or cutting step. It is also possible to manufacture the two half sections by first cutting a full section from a block of cured mineral wool and then cutting in one and the same step, the full section into two half sections, wherein one has a groove in each of the two longitudinal thickness-wise edges of the half section, and the other has a tongue in each of the two longitudinal thickness-wise edges of the half section.

As in the first and second embodiment, the tongues are slightly wider than the grooves. Installation of the two different half sections of this embodiment may be done in a similar way to that depicted in FIG. 3, i.e. by shortening the first half section and then alternately installing full-length half sections on the top or below the pipe line.

Fourth Embodiment

The present invention may also be advantageously used for insulating large industrial containers. In this embodiment a full section is achieved by interconnecting several, e.g. 3 or more (the exact amount depending on the size of the container) identically shaped and sized (or at least substantially identically shaped and sized) curvilinear mineral wool partial sections. Each partial section is provided with a groove extending along a first longitudinal edge of the two thickness-wise edges of the partial section that run in the longitudinal direction of the half section, and a tongue extending along a second longitudinal edge of the two thickness-wise edges of the partial sections that run in the longitudinal direction of the partial section. The greater the number of partial sections that are required for achieving a full insulation section around the container, the smaller is the degree of curvature of the main surfaces of the partial sections. For very large containers the curvature is almost flat.

In the above description the tongues and grooves are provided along the thickness-wise edges that run in the longitudinal direction of the inter-connectable partial sections and the pipe section to be formed, but the tongues and grooves can be provided also along the two thickness-wise edges that run in the transverse direction of the length of the inter-connectable partial sections and the pipe section to be formed to provide a secure end-to-end locking of the successive pipe sections.

In the above description the partial sections of the mineral wool pipe insulations are made by sawing or cutting but it is also conceivable to manufacture the separate partial sections by supplying a mixture of loose mineral wool fibers and a curable binder in a mold to shape the mixture into desired form and then curing thus obtained partial section in the mold.

Although illustrative embodiments of the present invention are shown in the drawings and described above, it is to be understood that modifications can be made without departing from the scope and spirit of the invention.

The invention claimed is:

1. Mineral wool pipe insulation comprising mineral wool including a mix of mineral wool fibers and at least a curable binder being cured, said mineral wool pipe insulation further comprising at least first and second separate elongated partial sections of mineral wool that are inter-connectable to each other around a pipe or container to form an insulation layer encompassing said pipe or container, the first separate elongated partial section being inter-connectable with the second separate elongated partial section by being provided with an interconnecting portion along at least two thickness-wise edges thereof, wherein the interconnecting portion of the first separate elongated partial section comprises a groove shaped directly in the mineral wool and the interconnecting portion of the second separate elongated partial section comprises a tongue shaped directly in the mineral wool, wherein the tongue of the second separate elongated partial section is larger than the corresponding groove of the first separate elongated partial section to which the tongue of the second separate elongated partial section is to be connected to such an extent that the tongue of the second separate elongated partial section is pressable into the groove of the first separate elongated partial section, and locked therein upon release of pressure.

2. The mineral wool pipe insulation according to claim 1, wherein the interconnecting portion of each of the first and second separate elongated partial sections is provided along the two thickness-wise edges and extend in the longitudinal direction of the first and second separate elongated partial sections.

3. The mineral wool pipe insulation according to claim 2, wherein the interconnecting portion of each of the first and second separate elongated partial sections is provided along the two thickness-wise edges that run in the transverse direction of the length of the first and second separate elongated partial sections.

4. The mineral wool pipe insulation according to claim 1, wherein the first and second separate elongated partial sections each comprising first and second thickness-wise edges and a groove in the first of the thickness-wise edges that extends in a longitudinal direction of the first and second separate elongated partial sections, and a tongue in the second of the thickness-wise edges that extends in the longitudinal direction of the first and second separate elongated partial sections.

5. The mineral wool pipe insulation according to claim 1, wherein the first and second separate elongated partial sections each comprising first and second thickness-wise edges and, being otherwise identical with the exception of the first separate elongated partial section being provided with a groove in each of the two thickness-wise edges that extends in a longitudinal direction of said first separate elongated partial section, and the second separate elongated partial section being provided with a tongue in each of the two thickness-wise edges that extend in a longitudinal direction of said second separate elongated partial section.

6. A method of manufacturing mineral wool pipe insulation according to claim 1, wherein each separate partial section of mineral wool is made by sawing or cutting from a cured block of mineral wool.

7. A method of manufacturing mineral wool pipe insulation according to claim 1, wherein each separate partial section of mineral wool is made by curing a mixture of loose mineral wool fibers and a curable binder in a mold.

8. The mineral wool pipe insulation according to claim 1, wherein the mineral wool comprises only mineral wool fibers and at least one curable binding agent.

9. The mineral wool pipe insulation according to claim 8, wherein the mineral wool has a density in the range of 40-150 $kg/m^3$.

10. The mineral wool pipe insulation according to claim 1, wherein the mineral wool further comprises a fire retardant.

* * * * *